US010882255B2

(12) United States Patent
Kabaria et al.

(10) Patent No.: US 10,882,255 B2
(45) Date of Patent: Jan. 5, 2021

(54) MASS CUSTOMIZATION IN ADDITIVE MANUFACTURING

(71) Applicant: Carbon, Inc., Redwood City, CA (US)

(72) Inventors: Hardik Kabaria, San Francisco, CA (US); Aidan Kurtz, Palomar Park, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

(21) Appl. No.: 16/616,557

(22) PCT Filed: Oct. 22, 2018

(86) PCT No.: PCT/US2018/056842
§ 371 (c)(1),
(2) Date: Nov. 25, 2019

(87) PCT Pub. No.: WO2019/089252
PCT Pub. Date: May 9, 2019

(65) Prior Publication Data
US 2020/0384691 A1 Dec. 10, 2020

Related U.S. Application Data

(60) Provisional application No. 62/719,316, filed on Aug. 17, 2018, provisional application No. 62/579,346, filed on Oct. 31, 2017.

(51) Int. Cl.
*B29C 64/386* (2017.01)
*B29C 64/124* (2017.01)
(Continued)

(52) U.S. Cl.
CPC .......... *B29C 64/386* (2017.08); *B29C 64/124* (2017.08); *G06T 17/20* (2013.01); *B33Y 10/00* (2014.12); *B33Y 50/00* (2014.12)

(58) Field of Classification Search
CPC .................................................. B29C 64/386
See application file for complete search history.

(56) References Cited

U.S. PATENT DOCUMENTS

| 4,785,075 A | 11/1988 | Shimp |
| 5,236,637 A | 8/1993 | Hull |

(Continued)

FOREIGN PATENT DOCUMENTS

| EP | 2855963 | 4/2015 |
| EP | 3147202 | 3/2017 |

(Continued)

OTHER PUBLICATIONS

Brauner, et al., "Meso-level manufacturing process simulation of sandwich structures to analyze viscoelastic-dependent residual stresses", Journal of Composite Materials, 46(7): 783-799 (2012).

(Continued)

*Primary Examiner* — Larry W Thrower
(74) *Attorney, Agent, or Firm* — Myers Bigel, P.A (57) ABSTRACT

A method for the production of an object by additive manufacturing includes inputting a boundary shape and desired mechanical properties for said object, subdividing said boundary shape into a plurality of adjacent work cells, providing a plurality of lattices in a database, each lattice of the database including a geometry and a mechanical property, filling a first one of said work cells with a lattice from the database, the lattice selected based on the correspondence of the mechanical properties of said lattice to said desired mechanical properties of said object, filling the remaining ones of said work cells with lattices from said database to produce a filled boundary shape, each said lattice selected based on: the correspondence of the mechanical properties of said lattice to the desired mechanical properties (Continued)

of the object, and the compatibility of adjacent lattices in adjacent work cells with one another.

9 Claims, 10 Drawing Sheets

(51) Int. Cl.
*G06T 17/20* (2006.01)
*B33Y 50/00* (2015.01)
*B33Y 10/00* (2015.01)

(56) References Cited

U.S. PATENT DOCUMENTS

| | | |
|---|---|---|
| 5,391,072 A | 2/1995 | Lawton et al. |
| 5,506,007 A | 4/1996 | Williams et al. |
| 5,529,473 A | 6/1996 | Lawton et al. |
| 5,787,269 A | 7/1998 | Hyodo |
| 6,623,687 B1 | 9/2003 | Gervasi et al. |
| 6,826,518 B1 | 11/2004 | Ivezic et al. |
| 7,438,846 B2 | 10/2008 | John |
| 7,892,474 B2 | 2/2011 | Shkolnik et al. |
| 8,110,135 B2 | 2/2012 | El-Siblani |
| 9,120,270 B2 | 9/2015 | Chen et al. |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,323,869 B1 | 4/2016 | Kanthasamy |
| 9,453,142 B2 | 9/2016 | Rolland et al. |
| 9,598,606 B2 | 3/2017 | Rolland et al. |
| 9,636,873 B2 | 5/2017 | Joyce |
| 9,676,963 B2 | 6/2017 | Rolland et al. |
| 9,902,114 B2 | 2/2018 | Musuvathy |
| 9,984,181 B2 | 5/2018 | Shayani et al. |
| 10,013,801 B2 | 7/2018 | Mehr |
| 10,037,020 B2 | 7/2018 | Rothenberg |
| 10,089,418 B2 | 10/2018 | Loss |
| 10,147,242 B2 | 12/2018 | Santhanam et al. |
| 10,347,052 B2 | 7/2019 | Hemani et al. |
| 10,363,703 B2 | 7/2019 | Banadyga et al. |
| 10,503,149 B2 | 12/2019 | Vernon |
| 10,521,517 B2 | 12/2019 | Benjamin et al. |
| 10,635,088 B1 | 4/2020 | Bandara et al. |
| 2015/0223560 A1 | 8/2015 | Wawrousek et al. |
| 2015/0331402 A1 | 11/2015 | Lin et al. |
| 2015/0360419 A1 | 12/2015 | Willis et al. |
| 2016/0027425 A1 | 1/2016 | Cook et al. |
| 2016/0042106 A1 | 2/2016 | Chauhan et al. |
| 2016/0288376 A1 | 10/2016 | Sun et al. |
| 2016/0374428 A1 | 12/2016 | Karmann et al. |
| 2016/0376783 A1 | 12/2016 | Ramaska |
| 2017/0129167 A1 | 5/2017 | Castanon |
| 2017/0129169 A1 | 5/2017 | Batchelder et al. |
| 2017/0291077 A1 | 10/2017 | Madson et al. |
| 2018/0126630 A1 | 5/2018 | Panzer et al. |
| 2018/0147062 A1 | 5/2018 | Ay et al. |
| 2018/0150059 A1 | 5/2018 | Deslandes et al. |
| 2018/0243976 A1 | 8/2018 | Feller |
| 2018/0268095 A1 | 9/2018 | Shayani et al. |
| 2018/0290374 A1 | 10/2018 | Willis et al. |
| 2019/0138670 A1 | 5/2019 | Bandara et al. |
| 2019/0146457 A1 | 5/2019 | Komzsik |
| 2019/0339670 A1 | 11/2019 | Tang et al. |
| 2020/0150625 A1 | 5/2020 | Yokoyama et al. |

FOREIGN PATENT DOCUMENTS

| | | |
|---|---|---|
| WO | 2012/024675 | 2/2012 |
| WO | 2015164234 A1 | 10/2015 |
| WO | 2016133759 A1 | 8/2016 |
| WO | 2016145182 A1 | 9/2016 |
| WO | 2019050842 A1 | 3/2019 |
| WO | 2020072767 A1 | 4/2020 |

OTHER PUBLICATIONS

Govik, et al., "Finite element simulation of the manufacturing process chain of a sheet metal assembly", Journal of Materials Processing Technology, 212(7): 1453-1462 (2012).

Jansuziewcz, et al., "Layerless fabrication with continuous liquid interface production", PNAS, 113(42): 11703-11708 (2016).

Karadeniz, et al., "A numerical study on the coefficients of thermal expansion of fiber reinforced composite materials", Composite Structures, 78(1): 1-10 (2007).

Maddux, et al., "CAE for the Manufacturing Engineer: The Role of Process Simulation in Concurrent Engineering", Advanced Manufacturing Processes, 1(3&4): 365-392 (1986).

International Search Report and Written Opinion corresponding to PCT/US2020/030382; dated Sep. 18, 2020 (8 pages).

International Search Report and Written Opinion corresponding to PCT/US2019/056697, dated Feb. 7, 2020 (13 pp).

International Search Report and Written Opinion corresponding to PCT/US2018/056842, dated Jan. 24, 2019 (9 pp).

Tubleston et al "Continuous liquid interface production of 3D objects" Science, 347(6228):1349-1352 (2015).

MASS CUSTOMIZATION IN ADDITIVE MANUFACTURING

RELATED APPLICATIONS

This application is a 35 U.S.C. § 371 national phase application of International Application Serial No. PCT/US2018/056842, filed Oct. 22, 2018, which claims priority to U.S. Provisional Application Ser. No. 62/579,346, filed Oct. 31, 2017, and U.S. Provisional Application Ser. No. 62/719,316, filed Aug. 17, 2018, the entire contents of which are hereby incorporated by reference.

FIELD OF THE INVENTION

The present invention concerns additive manufacturing in general, and more particularly concerns methods and apparatus for the efficient production of customized objects that include composite lattice structures.

BACKGROUND OF THE INVENTION

A group of additive manufacturing techniques sometimes referred to as "stereolithography" create a three-dimensional object by the sequential polymerization of a light polymerizable resin. Such techniques may be "bottom-up" techniques, where light is projected into the resin onto the bottom of the growing object through a light transmissive window, or "top down" techniques, where light is projected onto the resin on top of the growing object, which is then immersed downward into the pool of resin.

The recent introduction of a more rapid stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., "Continuous liquid interface production of 3D objects," *Science* 347, 1349-1352 (published online 16 Mar. 2015); see also Rolland et al., U.S. Pat. Nos. 9,676,963, 9,453,142, and 9,598,606).

By obviating the need to make expensive injection molds—required for the production of many products—additive manufacturing now presents the opportunity to produce objects that are highly customized for particular individuals or uses. However, the generation of highly customized data files remains time consuming, potentially computationally intensive, and hence expensive. Accordingly, there remains a need for new approaches to mass customization of products to be produced by additive manufacturing.

SUMMARY OF THE INVENTION

Various embodiments described herein provide a method for the rapid production of an object from a light-polymerizable resin by additive manufacturing, including: (a) inputting into a processor a boundary shape and a plurality of desired mechanical properties for said object; (b) subdividing said boundary shape into a plurality of adjacent work cells in the processor; (c) providing a plurality of lattices in a database, each lattice of the database including a geometry and a mechanical property; (d) filling a first one of said work cells with a lattice from the database, the lattice selected based on the correspondence of the mechanical properties of said lattice to said desired mechanical properties of said object; (e) filling the remaining ones of said work cells with lattices from said database to produce a filled boundary shape in the processor, each said lattice selected based on: (i) the correspondence of the mechanical properties of said lattice to the desired mechanical properties of the object, and (ii) the compatibility of adjacent lattices in adjacent work cells with one another; then 0 producing said object by additive manufacturing (e.g., by bottom-up or top-down stereolithography) from the light-polymerizable resin and the filled boundary shape.

In some embodiments, the method may include, after said filling step (e), the step of confirming that the mechanical properties of the filled boundary shape correspond to the desired mechanical properties for the object, and, if not, then repeating step (e) with different lattices from said database in said work cells until the mechanical properties of the filled boundary shape correspond to the desired mechanical properties of said object.

In some embodiments, the method may include, prior to said producing step (f), (and after said confirming step if present) the step of: performing a final manufacturing process simulation of said filled boundary shape as a check of manufacturability of said filled boundary shape.

In some embodiments, said database includes a manufacturability score for said additive manufacturing step for each said lattice, and said filling steps (d)-(e) are carried out with preference for lattices having a higher manufacturability score.

In some embodiments, said object is rigid, flexible, or elastic.

Various embodiments described also provide an additive manufacturing system including (a) an additive manufacturing apparatus (e.g., a bottom up stereolithography apparatus, such as a continuous liquid interface production apparatus); (b) a processing device; and (c) a memory comprising instructions which, when executed by the processing device, cause the processing device to carry out the method embodiments described herein with said additive manufacturing apparatus.

Various embodiments described also provide a computer program product including a non-transitory computer readable storage medium having computer readable software code sections embodied in the medium, which software code sections are configured to carry out the method embodiments described herein.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

1. Production by Additive Manufacturing (Overview).

Numerous polymerizable liquids (or "resins") for use in additive manufacturing are known and can be used in carrying out the present invention. See, e.g., U.S. Pat. No. 9,205,601 to DeSimone et al.

In some embodiments, the resin is a dual cure resin. Such resins are described in, for example, Rolland et al., U.S. Pat. Nos. 9,676,963; 9,598,606; and 9,453,142, the disclosures of which are incorporated herein by reference. Resins may be in any suitable form, including "one pot" resins and "dual precursor" resins (where cross-reactive constituents are packaged separately and mixed together before use, and which may be identified as an "A" precursor resin and a "B" precursor resin). Particular examples of suitable resins include, but are not limited to, Carbon, Inc. rigid polyurethane resin (RPU), flexible polyurethane resin (FPU), elastomeric polyurethane resin (EPU), cyanate ester resin (CE), epoxy resin (EPX), or urethane methacrylate resin (UMA), all available from Carbon, Inc., 1089 Mills Way, Redwood City, Calif. 94063 USA.

Note that, in some embodiments employing "dual cure" polymerizable resins, the part, following manufacturing, may be contacted with a penetrant liquid, with the penetrant liquid carrying a further constituent of the dual cure system, such as a reactive monomer, into the part for participation in a subsequent cure. Such "partial" resins are intended to be included herein.

Techniques for additive manufacturing are known. Suitable techniques include bottom-up or top-down additive manufacturing, generally known as stereolithography. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Pat. No. 9,636,873 to Joyce, and U.S. Pat. No. 9,120,270 to Chen et al. The disclosures of these patents are incorporated by reference herein in their entirety.

In some embodiments, the intermediate object is formed by continuous liquid interface production (CLIP). CLIP is known and described in, for example, PCT Application Nos. PCT/US2014/015486 (published as U.S. Pat. No. 9,211,678 on Dec. 15, 2015); PCT/US2014/015506 (also published as U.S. Pat. No. 9,205,601 on Dec. 8, 2015), PCT/US2014/015497 (also published as U.S. Pat. No. 9,216,546 on Dec. 22, 2015), and in J. Tumbleston, D. Shirvanyants, N. Ermoshkin et al., "Continuous liquid interface production of 3D Objects," *Science* 347, 1349-1352 (published online 16 Mar. 2015). See also R. Janusziewcz et al., "Layerless fabrication with continuous liquid interface production," *Proc. Natl. Acad. Sci. USA* 113, 11703-11708 (Oct. 18, 2016). In some embodiments, CLIP employs features of a bottom-up three-dimensional fabrication as described above, but the irradiating and/or said advancing steps are carried out while also concurrently maintaining a stable or persistent liquid interface between the growing object and the build surface or window, which may be an optically transparent member, such as by: (i) continuously maintaining a dead zone of polymerizable liquid in contact with said build surface, and (ii) continuously maintaining a gradient of polymerization zone (such as an active surface) between the dead zone and the solid polymer and in contact with each thereof, the gradient of polymerization zone comprising the first component in partially cured form. In some embodiments of CLIP, the optically transparent member comprises a semipermeable member (e.g., a fluoropolymer), and the continuously maintaining a dead zone is carried out by feeding an inhibitor of polymerization through the optically transparent member, thereby creating a gradient of inhibitor in the dead zone and optionally in at least a portion of the gradient of polymerization zone. Other approaches for carrying out CLIP that can be used in the present invention and potentially obviate the need for a semipermeable "window" or window structure include utilizing a liquid interface comprising an immiscible liquid (see L. Robeson et al., WO 2015/164234, published Oct. 29, 2015), generating oxygen as an inhibitor by electrolysis (see I. Craven et al., WO 2016/133759, published Aug. 25, 2016), and incorporating magnetically positionable particles to which the photoactivator is coupled into the polymerizable liquid (see J. Rolland, WO 2016/145182, published Sep. 15, 2016).

After the intermediate three-dimensional object is formed, it is optionally washed, optionally dried (e.g., air dried) and/or rinsed (in any sequence). In some embodiments it is then further cured, preferably by heating (although further curing may in some embodiments be concurrent with the first cure, or may be by different mechanisms such as contacting to water, as described in U.S. Pat. No. 9,453,142 to Rolland et al.).

2. Washing and Further Curing (Overview).

Objects as described above can be washed in any suitable apparatus, preferably with a wash liquid as described above.

Wash liquids that may be used to carry out the present invention include, but are not limited to, water, organic solvents, and combinations thereof (e.g., combined as co-solvents), optionally containing additional ingredients such as surfactants, chelants (ligands), enzymes, borax, dyes or colorants, fragrances, etc., including combinations thereof. The wash liquid may be in any suitable form, such as a solution, emulsion, dispersion, etc.

In some preferred embodiments, where the residual resin has a boiling point of at least 90 or 100° C. (e.g., up to 250 or 300° C., or more), the wash liquid has a boiling point of at least 30° C., but not more than 80 or 90° C. Boiling points are given herein for a pressure of 1 bar or 1 atmosphere.

Examples of organic solvents that may be used as a wash liquid, or as a constituent of a wash liquid, include, but are not limited to, alcohol, ester, dibasic ester, ketone, acid, aromatic, hydrocarbon, ether, dipolar aprotic, halogenated, and base organic solvents, including combinations thereof. Solvents may be selected in based, in part, on their environmental and health impact (see, e.g., GSK Solvent Selection Guide 2009). In some embodiments, the wash liquid comprises a hydrofluorocarbon, hydrochlorofluorocarbon, or hydrofluoroether solvent, such as 1,1,1,2,3,4,4,5,5,5-decafluoropentane (Vertrel® XF, DuPont™ Chemours), 1,1,1,3,3-Pentafluoropropane, 1,1,1,3,3-Pentafluorobutane, etc.

Any suitable wash apparatus can be used, including but not limited to a Carbon Inc. SMART WASHER™, available from Carbon, Inc., Redwood City, Calif., USA.

After washing, the object is in some embodiments further cured, preferably by heating or baking.

Heating may be active heating (e.g., in an oven, such as an electric, gas, solar oven or microwave oven, heated bath, or combination thereof), or passive heating (e.g., at ambient (room) temperature). Active heating will generally be more rapid than passive heating and in some embodiments is preferred, but passive heating—such as simply maintaining the intermediate at ambient temperature for a sufficient time to effect further cure—is in some embodiments preferred.

In some embodiments, the heating step is carried out at at least a first (oven) temperature and a second (oven) temperature, with the first temperature greater than ambient temperature, the second temperature greater than the first temperature, and the second temperature less than 300° C. (e.g., with ramped or step-wise increases between ambient temperature and the first temperature, and/or between the first temperature and the second temperature).

For example, the intermediate may be heated in a stepwise manner at a first temperature of about 70° C. to about 150° C., and then at a second temperature of about 150° C. to 200 or 250° C., with the duration of each heating depending on the size, shape, and/or thickness of the intermediate. In another embodiment, the intermediate may be cured by a ramped heating schedule, with the temperature ramped from ambient temperature through a temperature of 70 to 150° C., and up to a final (oven) temperature of 250 or 300° C., at a change in heating rate of 0.5° C. per minute, to 5° C. per minute. (See, e.g., U.S. Pat. No. 4,785,075 to Shimp.)

In some embodiments, the heating step is carried out in an inert gas atmosphere. Inert atmosphere ovens are known, and generally employ an atmosphere enriched in nitrogen, argon, or carbon dioxide in the oven chamber. Suitable examples include but are not limited to those available from Grieve Corporation, 500 Hart Road, Round Lake, Ill. 60073-2898 USA, Davron Technologies, 4563 Pinnacle Lane, Chattanooga, Tenn. 37415 USA, Despatch Thermal Processing Technology, 8860 207th Street, Minneapolis, Minn. 55044 USA, and others.

In other embodiments, the heating step is carried out in an inert liquid bath. Suitable inert liquids may be aqueous liquids (i.e., pure water, salt solutions, etc.), organic liquids (e.g., mineral oil, fluorinated, perfluorinated, and polysiloxane organic compounds such as perfluorohexane, perfluoro(2-butyl-tetrahydrofurane), perfluorotripentylamine, etc. (commercially available as PERFLUORINERT® inert liquids from 3M Company), and mixtures thereof. These inert liquids can be deoxygenated if necessary, such as by bubbling an inert gas such as nitrogen through the liquid, by boiling the inert liquid, by mixing oxygen-scavenging agents with the inert liquid medium (or contacting them to one another), etc., including combinations thereof (see, e.g., U.S. Pat. No. 5,506,007 to Williams et al.).

In some embodiments, the further curing or heating step (whether carried out in a liquid or gas fluid) is carried out at an elevated pressure (e.g., elevated sufficiently to reduce volatilization or out-gassing of residual monomers, prepolymers, chain extenders, and/or reactive diluents, etc.). Suitable pressure ranges are from 10 or 15 psi to 70 or 100 psi, or more.

3. Systems and Apparatus.

Figure 1:
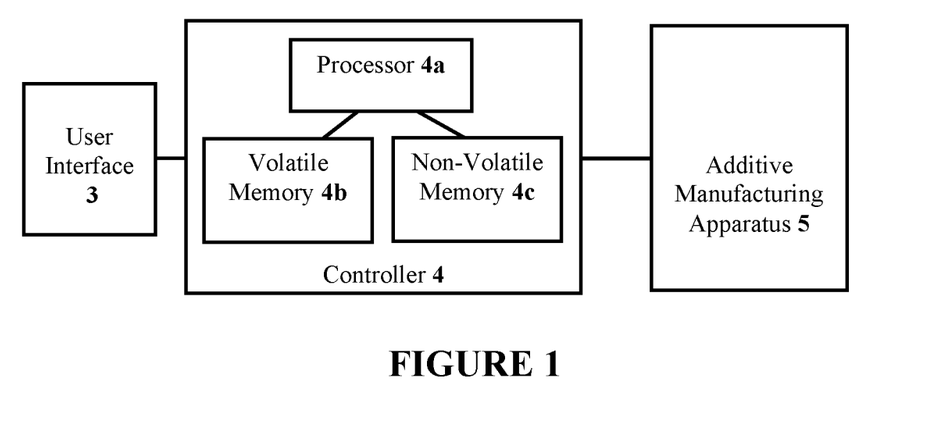
FIG. 1 schematically illustrates an apparatus of the present invention.

The foregoing can be combined into apparatus and methods for carrying out the present invention, as first schematically illustrated in FIG. 1. Such an apparatus includes a user interface 3 for inputting instructions (such as selection of an object to be produced, and selection of features to be added to the object), a controller 4, and a stereolithography apparatus 5 such as described above. An optional washer (not shown) can be included in the system if desired, or a separate washer can be utilized. Similarly, for dual cure resins, an oven (not shown) can be included in the system, although operated separate oven can also be utilized.

Connections between components of the system can be by any suitable configuration, including wired and/or wireless connections. The components may also communicate over one or more networks, including any conventional, public and/or private, real and/or virtual, wired and/or wireless network, including the Internet.

The controller 4 may be of any suitable type, such as a general-purpose computer. Typically the controller will include at least one processor 4a, a volatile (or "working") memory 4b, such as random-access memory, and at least one non-volatile or persistent memory 4c, such as a hard drive or a flash drive. The controller 4 may use hardware, software implemented with hardware, firmware, tangible computer-readable storage media having instructions stored thereon, and/or a combination thereof, and may be implemented in one or more computer systems or other processing systems. The controller 4 may also utilize a virtual instance of a computer. As such, the devices and methods described herein may be embodied in any combination of hardware and software that may all generally be referred to herein as a "circuit," "module," "component," and/or "system." Furthermore, aspects of the present invention may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one processor 4a of the controller 4 may be configured to execute computer program code for carrying out operations for aspects of the present invention, which computer program code may be written in any combination of one or more programming languages, including an object oriented programming language such as Java, Scala, Smalltalk, Eiffel, JADE, Emerald, C++, C #, VB.NET, or the like, conventional procedural programming languages, such as the "C" programming language, Visual Basic, Fortran 2003, COBOL 2002, PHP, ABAP, dynamic programming languages such as Python, PERL, Ruby, and Groovy, or other programming languages.

The at least one processor 4a may be, or may include, one or more programmable general purpose or special-purpose microprocessors, digital signal processors (DSPs), programmable controllers, application specific integrated circuits (ASICs), programmable logic devices (PLDs), field-programmable gate arrays (FPGAs), trusted platform modules (TPMs), or a combination of such or similar devices, which may be collocated or distributed across one or more data networks.

Connections between internal components of the controller 4 are shown only in part and connections between internal components of the controller 4 and external components are not shown for clarity, but are provided by additional components known in the art, such as busses, input/output boards, communication adapters, network adapters, etc. The connections between the internal components of the controller 4, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, an Advanced Technology Attachment (ATA) bus, a Serial ATA (SATA) bus, and/or an Institute of Electrical and Electronics Engineers (IEEE) standard 1394 bus, also called "Firewire."

The user interface 3 may be of any suitable type. The user interface 3 may include a display and/or one or more user input devices. The display may be accessible to the at least one processor 4a via the connections between the system components. The display may provide graphical user interfaces for receiving input, displaying intermediate operation/data, and/or exporting output of the methods described herein. The display may include, but is not limited to, a monitor, a touch screen device, etc., including combinations thereof. The input device may include, but is not limited to, a mouse, keyboard, camera, etc., including combinations thereof. The input device may be accessible to the at least one processor 4a via the connections between the system components. The user interface 3 may interface with and/or be operated by computer readable software code instructions resident in the volatile memory 4b that are executed by the processor 4a.

4. Methods.

Figure 2:
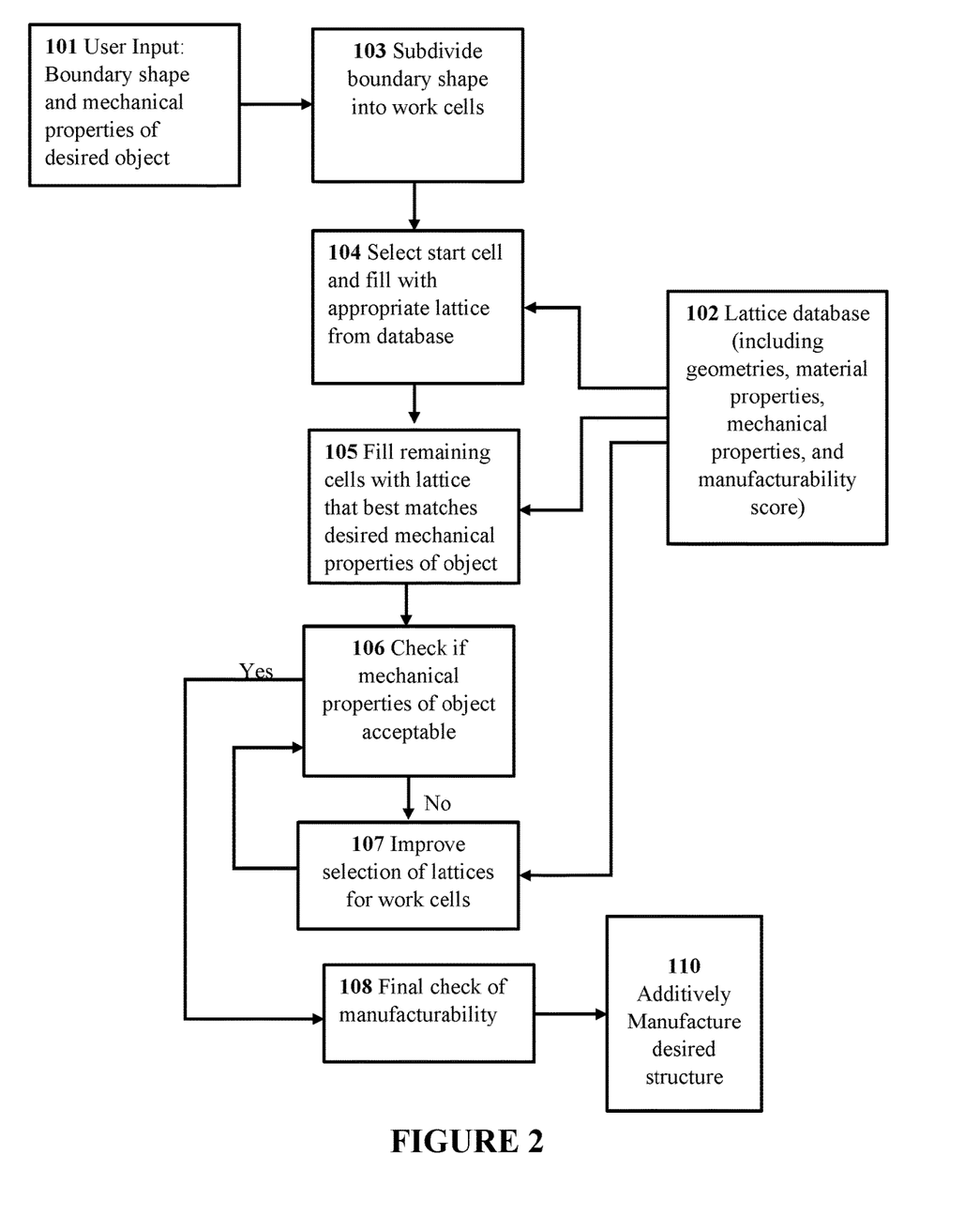
FIG. 2 schematically illustrates a process of the present invention.
Figure 3:
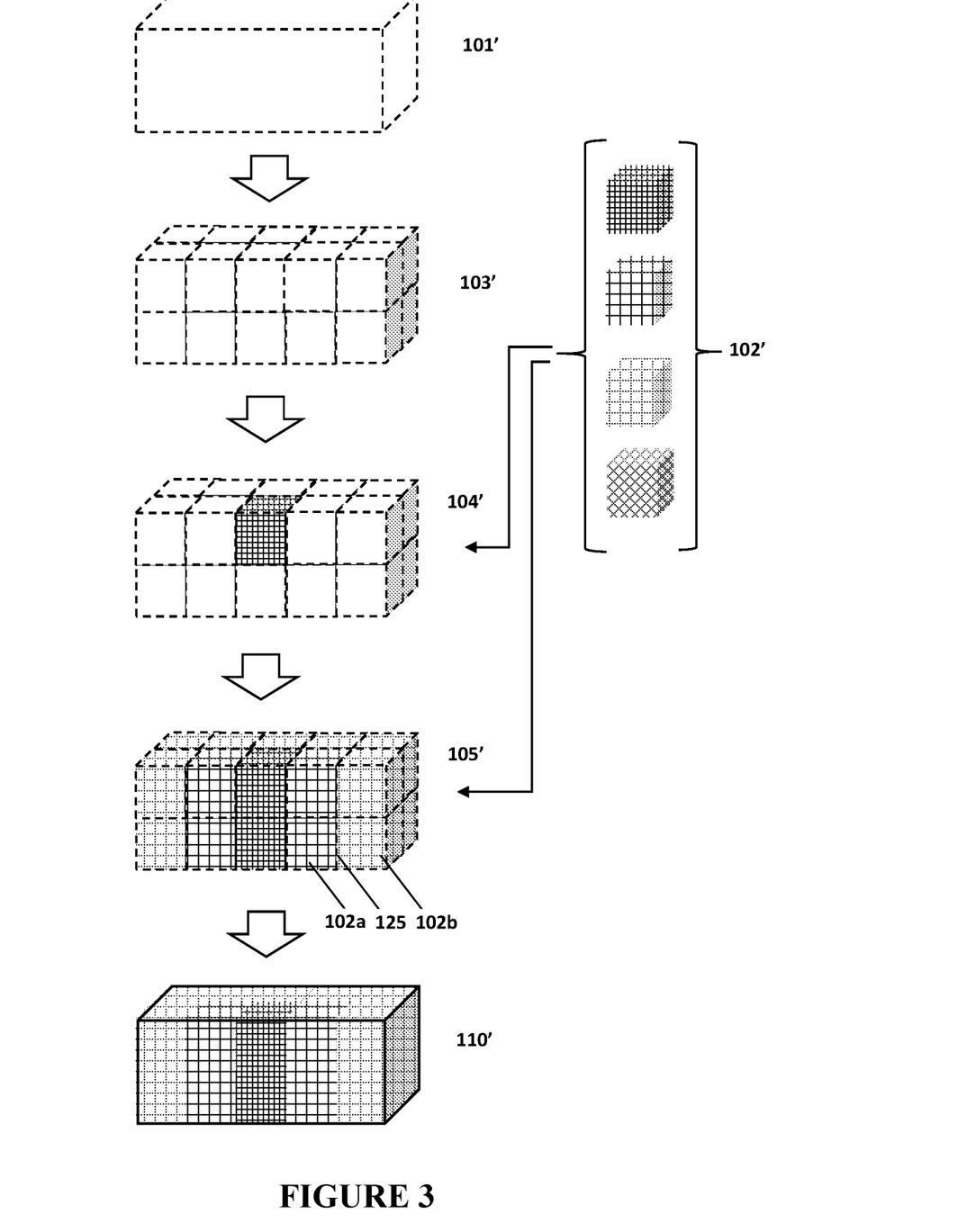
FIG. 3 schematically illustrates one embodiment of a product produced by a process of the present invention.
Figure 4A:
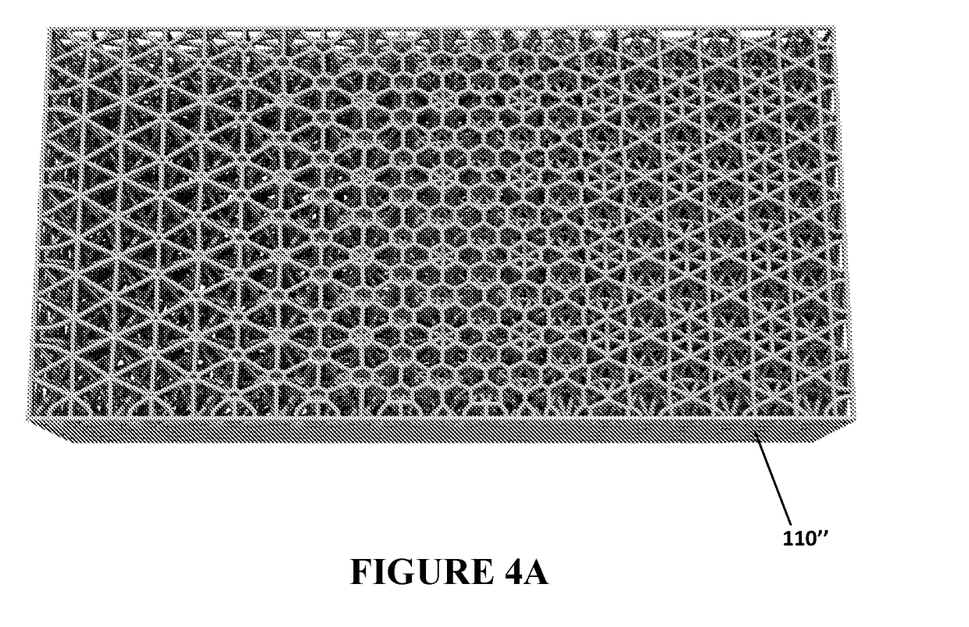
FIGS. 4A and 4B illustrate an example computer-generated rendering of a lattice combination and a completed prototype produced by a process of the present invention.
Figure 4B:
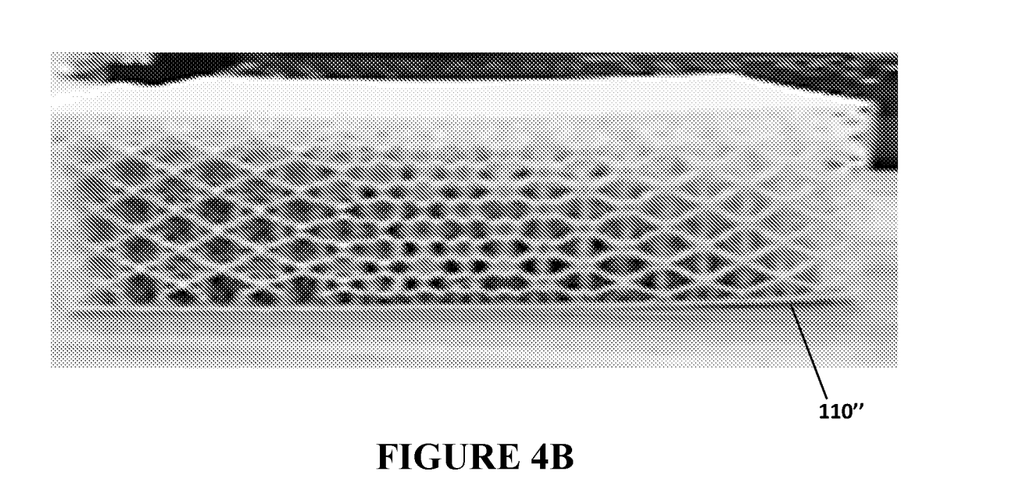
Figure 5:
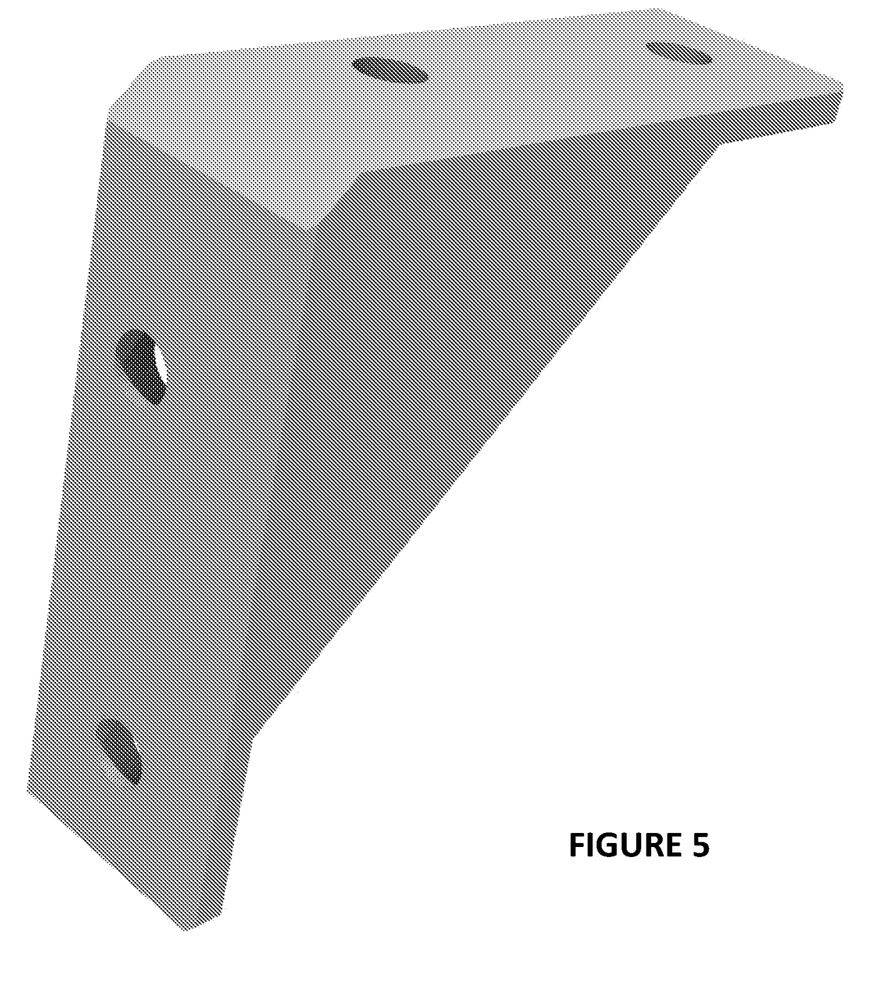
FIG. 5 is a rear perspective view of an example corner bracket primitive, prior to being filled with lattices by a process of the present invention.

A non-limiting example of a method of carrying out the present invention is schematically illustrated in FIG. 2. FIG. 3 illustrates one embodiment of a product produced by the process of FIG. 2, with example intermediate embodiments. FIGS. 4A and 4B illustrate an example computer-generated rendering of a lattice combination and a completed prototype produced by a process of the present invention. In overview, the method of FIG. 2 produces a three-dimensional (3D) object from input provided by a user, including desired mechanical properties of the 3D object. The 3D object that is produced is a real object that is physical and tangible, as illustrated, for example, by the prototype of FIG. 4B. The 3D object may be rigid, flexible, or elastic, or any combination thereof. For example, some portions of the 3D object may be rigid, while other portions of the 3D object may be flexible. The method may utilize an additive manufacturing apparatus such as, for example, the apparatus illustrated in FIG. 1.

Referring to FIGS. 2 and 3, the method includes an operation in which a user provides 101 characteristics of the 3D object to be manufactured. In some embodiments, the user input 101 may describe a geometry of the 3D object. In some embodiments, the geometry of the user input 101 may include a polysurface file (e.g., an .iges file) or a boundary representation (BREP) file (e.g., a .stl, .obj, .ply, 3mf, .amf, or .mesh file). In some embodiments, the user input 101 may include a boundary shape such as, for example, an outer surface, of the 3D object. In some embodiments, the user input 101 may also include mechanical properties of the 3D object. The mechanical properties may include, but are not limited to, descriptions of a flexibility of a portion, or all, of the 3D object, a strength of a portion, or all, of the 3D object, etc. For example, in some embodiments, the user input 101 may specify a mechanical property describing a desired flexibility for the 3D object. In some embodiments the user input 101 may specify a first mechanical property describing a desired first flexibility for a first portion of the 3D object, and a second mechanical property describing a desired second flexibility for a second portion of the 3D object. That is to say that the user input 101 may include different mechanical properties for different portions of the 3D object.

The method may also include providing a lattice database 102. The lattice database 102 may include a plurality (e.g., two or more) of lattice types. For each lattice type, the database may include information about the lattice type including, but not limited to, a geometry of the lattice type, one or more material properties of the lattice type, one or more mechanical properties of the lattice type, and/or a manufacturability score for the lattice type. The manufacturability score may indicate a metric with respect to manufacturing the lattice type. For example, the manufacturability score may indicate a complexity of manufacturing the lattice type, a reliability of manufacturing the lattice type, a cost of manufacturing the lattice type, etc. In some embodiments, a higher manufacturability score may indicate a higher desirability with respect to manufacturing the given lattice type, though the present invention is not limited thereto. For example, in some embodiments, a lower manufacturability score may indicate a higher desirability with respect to manufacturing the given lattice type. FIG. 3 illustrates an example of various lattice types 102' that may be included as part of the lattice database 102. The lattice database 102 may be externally provided. In some embodiments, some portion of the lattice database 102 may be provided based on materials used to create respective ones of the lattice types. In some embodiments, the lattice database 102 may be capable of being externally updated.

As noted above, the user input 101 may include a boundary shape. FIG. 3 illustrates an example of a boundary shape 101' that may be provided by the user input 101. Within FIG. 3, dashed lines are used to illustrate shapes that may be generated within the memory of a computer, such as controller 4 of FIG. 1. Referring again to FIG. 2, in operation 103, the boundary shape 101' from the user input 101 is subdivided into a plurality (e.g., two or more) work cells. Subdividing the boundary shape 101' may include dividing the boundary shape 101' into adjacent cells. In some embodiments, the adjacent work cells may each be of a uniform size. In some embodiments, one or more of the work cells may be of a non-uniform size. FIG. 3 illustrates an intermediate boundary shape 103' which has been subdivided into work cells. Though the embodiment of FIG. 3 illustrates work cells which are in a cube shape, it will be understood that the present invention is not limited thereto. The work cells may be cubes, cuboids, pyramids, prisms, etc. Similarly, though FIG. 3 illustrates work cells of a uniform shape, it will be understood that individual ones of the work cells may be different shapes.

Referring again to FIG. 2, in some embodiments the method may continue with operation 104 in which a start cell of the plurality of work cells may be selected. Once the start cell is selected, the start cell may be filled in with a lattice type selected from lattice database 102. The lattice type selected from the lattice database 102 may be selected based, in part, on a comparison of the mechanical properties of the lattice type as retrieved from the lattice database 102 with the mechanical properties provided as part of the user input 101. In some embodiments, when more than one lattice type from the lattice database 102 meets or exceeds the mechanical properties of the user input 101, the lattice type may be selected based on the manufacturability score of the given lattice type. In other words, if multiple lattice types meet the mechanical properties of the user input 101, the lattice type may be selected based on which lattice type has a more desirable (e.g., a higher) manufacturing score. FIG. 3 illustrates an example 104' of the selection of a start cell of the plurality of work cells. Though FIG. 3 illustrates a particular start cell with a particular first lattice type, it will be understood that other start cells and/or lattice types may be initially selected.

Referring again to FIG. 2, in some embodiments the method may continue with operation 105 in which the remaining adjacent work cells are filled with lattice types. The lattice types for the adjacent work cells may be selected based on a comparison of the mechanical property of a particular lattice type, as retrieved from the lattice database 102, and the desired mechanical property of the object from the user input 101. In some embodiments, the lattice type for a given work cell may also be selected based on a compatibility of a particular lattice type, as retrieved from the lattice database 102, with the lattice type of an adjacent work cell. Correspondence or compatibility of adjacent lattices in adjacent work cells with one another can be carried out in accordance with known techniques, or variations thereof that will be apparent to those skilled in the art. (see, e.g., Z. Karadeniz and D. Kumlutas, *A numerical study on the coefficients of thermal expansion of fiber reinforced composite materials*, Composite Structures 78, 1-10 (2007) (three-dimensional FEA unit cell models to predict $\alpha_1$ and $\alpha_2$ for several types of composites); V. Liseikin, *A computational differential geometry approach to grid generation* (2006)). FIG. 3 illustrates an example 105' in which an example configuration of lattice types have been selected for respective ones of the plurality of work cells. The configuration illustrated in FIG. 3 is merely an example, and other configurations are possible. As illustrated in FIG. 3, an output of operation 105 may be a filled boundary shape 105' of work cells for manufacture of the 3D object.

In some embodiments, as part of filling out the remaining work cells, transitions may be provided between two adjacent work cells having different lattice types, e.g., first work cell with a first lattice type 102a and second work cell with a second lattice type 102b. For example, the boundary shape 105' of work cells may be configured such that a boundary region 125 between two adjacent work cells having two different lattice types 102a, 102b provides interconnections between the two adjacent work cells. Though the boundary region 125 is illustrated as line in FIG. 3, it will be understood that the boundary 125 may not be a discrete transition. In some embodiments, the boundary 125 may continuously extend over a finite distance between a first work cell and a second work cell. In other words, the boundary 125 may be a transition area between two adjacent work cells and thus may be referred to as a transition segment. In some embodiments, the struts of one work cell (e.g., a first work cell) may be fused to the struts of an adjacent work cell (e.g., a transition segment). In some embodiments, boundary morphing may be employed to smooth a surface of an object (e.g., an outer surface of a 3D object) and provide a flat surface seen.

Referring again to FIG. 2, in some embodiments the method may continue with operation 106 in which the configuration of work cells determined in operation 105 may be examined for compatibility with desired mechanical properties of the 3D object. For example, mechanical properties of the filled boundary shape 105' of work cells may be examined to determine if the mechanical properties are suitable for the 3D object. In some embodiments, the desired mechanical properties of the 3D object may be based, in part, on the desired mechanical properties provided as part of the user input 101. In some embodiments, testing the mechanical properties 106 may involve computer simulation of the filled boundary shape 105' of work cells based on mathematical and/or empirical models associated with the 3D object.

In some embodiments, if, in operation 106, the mechanical properties of the filled boundary shape 105' are found to be unacceptable ("No" in FIG. 2), the operations may continue with operation 107 in which the filled boundary shape 105' is further improved. The improvement 107 may include additional references to the lattice database 102. In some embodiments, the improvement 107 may include changing the configuration of lattice types of one or more work cells the filled boundary shape 105'. In some embodiments, the improvement 107 may include starting the process described with respect to operation 105 over from the beginning to select a different lattice type for the first work cell. In some embodiments, the improvement 107 may include reconfiguration of the lattice types of a subset of the work cells without changing others of the work cells. After the improvement 107 is complete, operation 106 to examine the mechanical properties of the filled boundary shape 105' of the work cells may be repeated until the mechanical properties are found to be acceptable ("Yes" in FIG. 2).

In some embodiments, once the mechanical properties of the filled boundary shape 105' are found to be acceptable, the operations may continue with operation 108 in which a final check of manufacturability may be performed. The manufacturability check may include a simulation of the manufacturing process based on the filled boundary shape 105' of the work cells of the 3D object. Manufacturing process simulation can be carried out in accordance with known techniques, or variations thereof that will be apparent to those skilled in the art (see, e.g., K. Maddux and S. Jain, CAE for the Manufacturing Engineer: The Role of Process Simulation in Concurrent Engineering, Advanced Manufacturing Processes 1, 365-392 (1986); C. Brauner et al., *Meso-level manufacturing process simulation of sandwich structures to analyze viscoelastic-dependent residual stresses*, Journal of Composite Materials 46, 783-799 (2012); A. Govik et al., *Finite element simulation of the manufacturing process chain of a sheet metal assembly*, Journal of Materials Processing Technology 212, 1453-1462 (2012); T. Hyodo, *Process simulation apparatus and method for selecting an optimum simulation model for a semiconductor manufacturing process* U.S. Pat. No. 5,787,269 (1998); N. Ivezic and T. Potok, *Method for distributed agent-based non-expert simulation of manufacturing process behavior*, U.S. Pat. No. 6,826,518 (2004)).

In some embodiments, the boundary object, as modified with the configuration of work cells as determined using the methods described herein, may be used to produce 110 the modified 3D object. Manufacturing of the modified 3D object 110 may be performed, for example, by an additive manufacturing apparatus, such as that illustrated in FIG. 1. The 3D object may be manufactured to include, in part, a polymer, such as those described herein. In some embodiments, the additive manufacturing may be carried out by stereolithography, preferably by CLIP. FIG. 3 illustrates an example of the manufactured 3D object 110'.

FIG. 4A illustrates an example computer-generated rendering of a lattice combination based on embodiments of the processes described herein. FIG. 4B illustrates an example completed prototype object 110" manufactured based on the computer-generated rendering of FIG. 4A. FIGS. 4A and 4B show the object 110" that includes two segments having two different lattice types and a transition segment between the two segments. The struts of one segment are fused to the struts of the adjacent segment. In addition, boundary morphing is employed to smooth a surface (e.g., an outer surface) of the object 110" and provide the flat surface seen.

Figure 6:
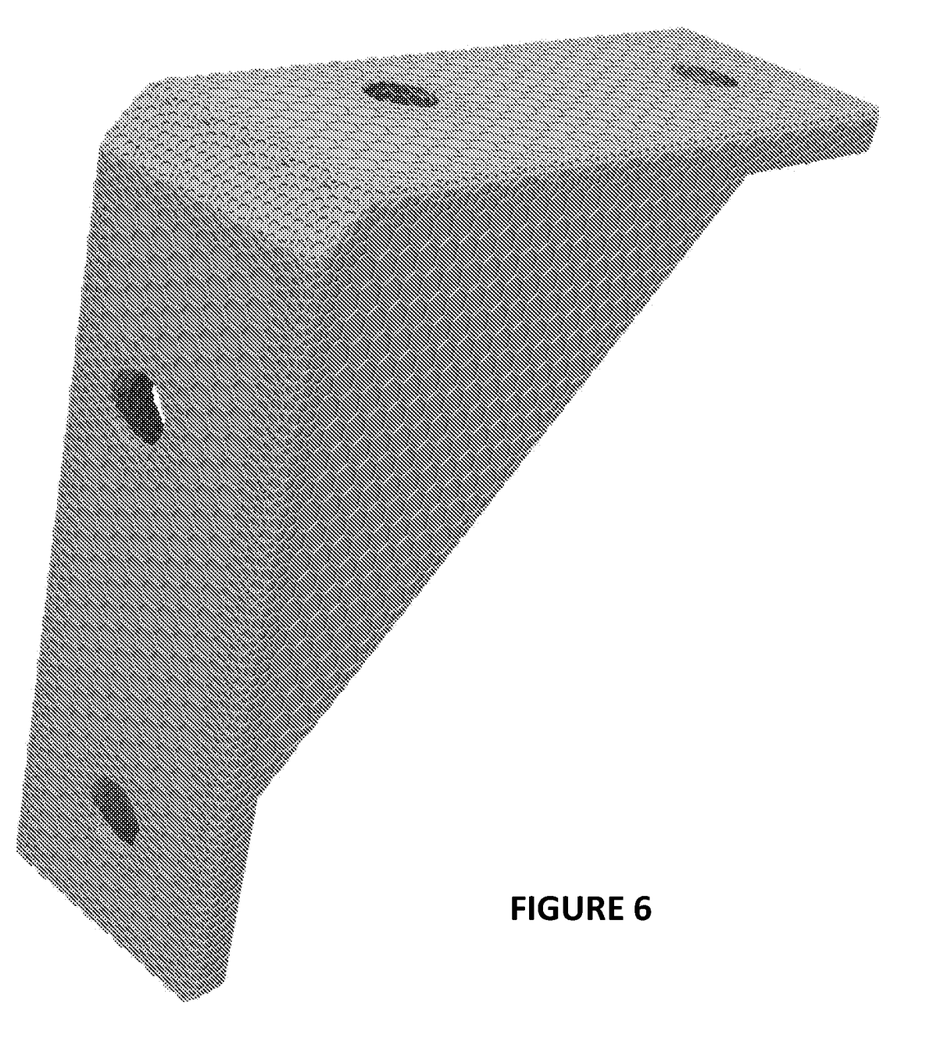
FIG. 6 is a rear perspective view of the example corner bracket of FIG. 5, partially converted to a lattice fill in a process of the present invention.
Figure 7:
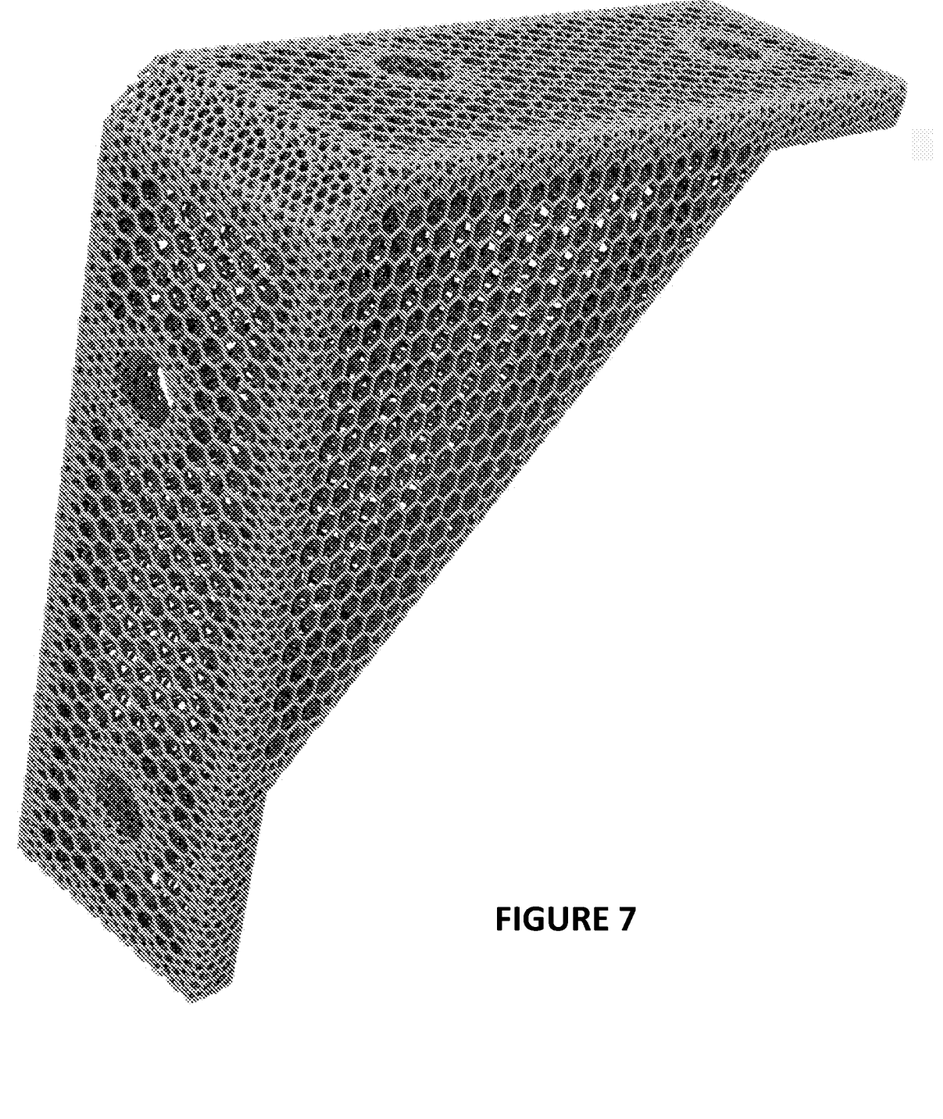
FIG. 7 is a rear perspective view of the example corner bracket of FIGS. 5-6, fully converted to lattice fill by a process of the present invention.
Figure 8:
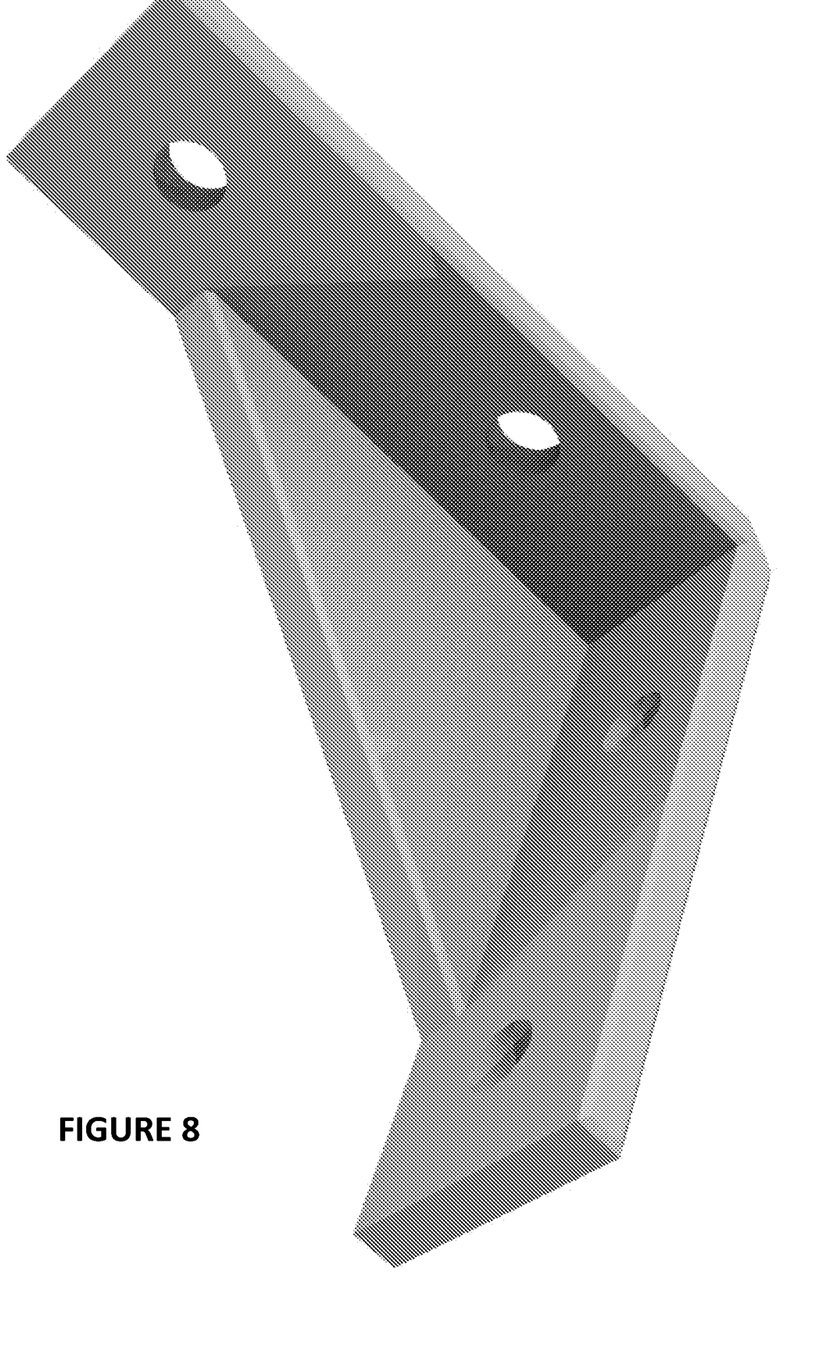
FIG. 8 is a front perspective view of the example corner bracket primitive of FIGS. 5-7.
Figure 9:
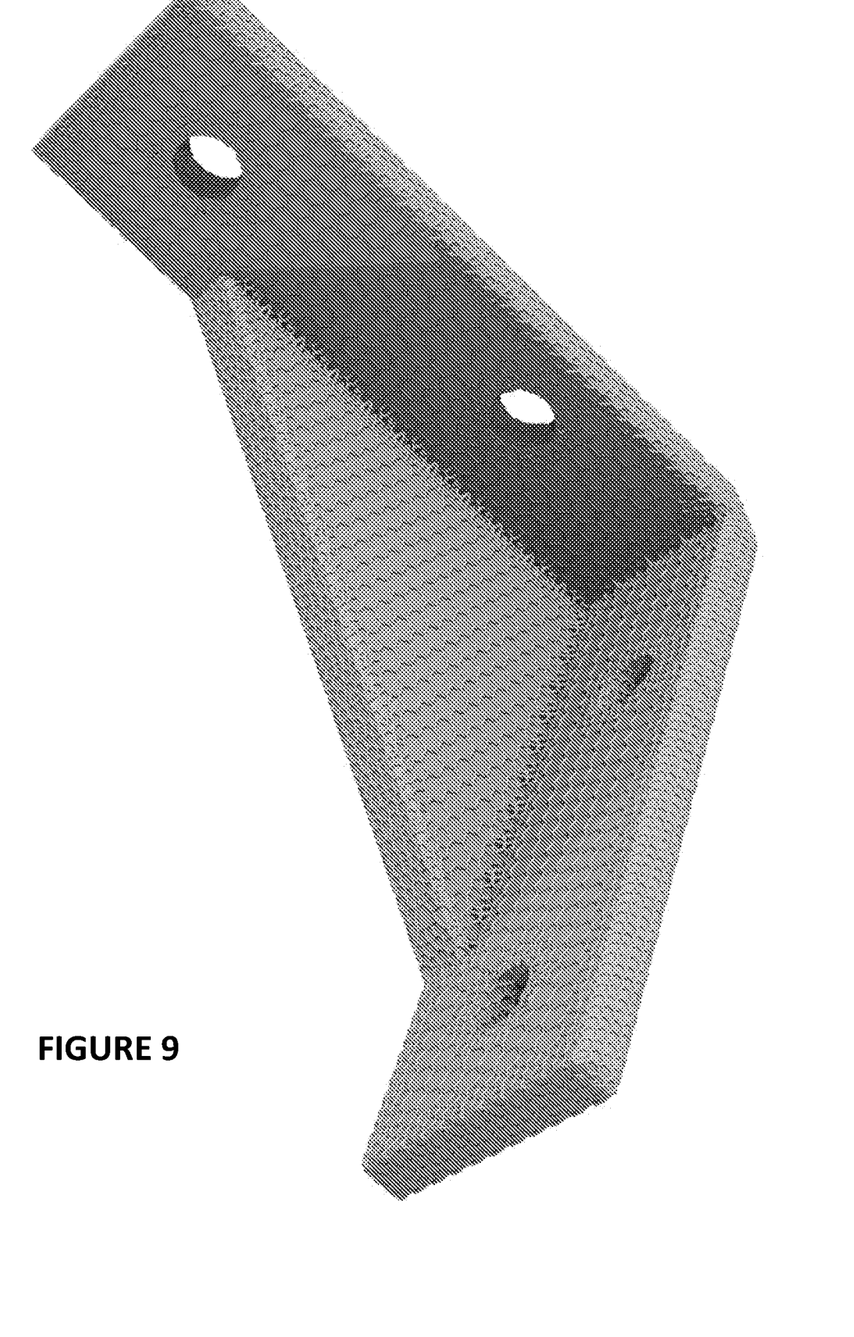
FIG. 9 is a front perspective view of the example corner bracket of FIGS. 5-8, partially lattice filled.
Figure 10:
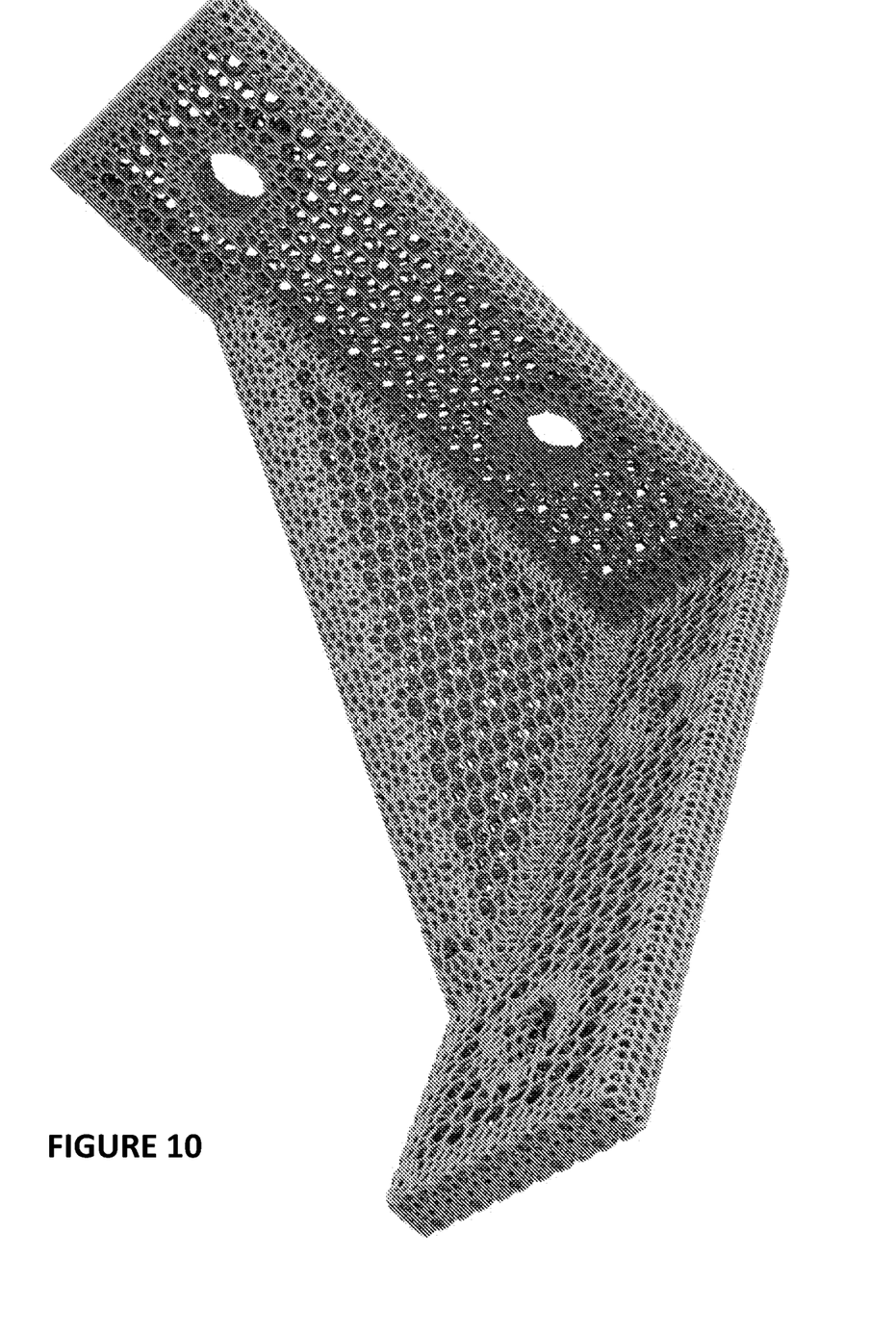
FIG. 10 is a front perspective view of the example corner bracket of FIGS. 5-9, fully converted to lattice fill by the process of the present invention.

FIGS. 5-10 show the conversion of an example corner bracket primitive (FIGS. 5 and 8) to a lattice filled object (FIGS. 7 and 10), through a partially converted intermediate illustration thereof (FIGS. 6 and 9). Note the filling with multiple lattices in a compatible format.

Examples of objects that can be produced by the methods of the present invention include, but are not limited to, rigid, flexible, and elastic objects (wholly or partially lattice and with or without a surface "skin" or continuous outer layer over at least a portion thereof formed from the same material as the lattice during additive manufacturing thereof), such as wheels, airless tires and component parts thereof, eyeglass frames, seats, seat cushions, bike seats and other saddles, headset cushions, ear buds, shock absorbers, boxing gloves, helmets and helmet liners, protective pads and protective padding, undergarments such as brassieres and other form-fitting garments, midsoles, braces, beams, frames, etc., any of which can be utilized as formed, or wholly or partially wrapped or covered with another material such as a polymer film, woven or nonwoven fabric, leather, etc., including laminates thereof.

The foregoing is illustrative of the present invention, and is not to be construed as limiting thereof. The invention is defined by the following claims, with equivalents of the claims to be included therein.

We claim:

1. A method for the rapid production of an object from a light-polymerizable resin by additive manufacturing, comprising:
    (a) inputting into a processor a boundary shape and a plurality of desired mechanical properties for said object;
    (b) subdividing said boundary shape into a plurality of adjacent work cells in the processor;
    (c) providing a plurality of lattices in a database, each lattice of the database including a geometry and a mechanical property;
    (d) filling a first one of said work cells with a lattice from the database, the lattice selected based on the correspondence of the mechanical properties of said lattice to said desired mechanical properties of said object;
    (e) filling the remaining ones of said work cells with lattices from said database to produce a filled boundary shape in the processor, each said lattice selected based on: (i) the correspondence of the mechanical properties of said lattice to the desired mechanical properties of the object, and (ii) the compatibility of adjacent lattices in adjacent work cells with one another; then
    (f) producing said object by additive manufacturing from the light-polymerizable resin and the filled boundary shape,
    wherein said database includes a manufacturability score for said additive manufacturing step for each said lattice, and said filling steps (d)-(e) are carried out with preference for lattices having a higher manufacturability score.

2. The method of claim 1, further comprising, after said filling step (e) the step of:
    confirming that the mechanical properties of the filled boundary shape correspond to the desired mechanical properties for the object, and, if not, then repeating step (e) with different lattices from said database in said work cells until the mechanical properties of the filled boundary shape correspond to the desired mechanical properties of said object.

3. The method of claim 1, further comprising, prior to said producing step (f), the step of:
    performing a final manufacturing process simulation of said filled boundary shape as a check of manufacturability of said filled boundary shape.

4. The method of claim 1, wherein said object is rigid, flexible, or elastic.

5. The method of claim 1, wherein during said producing step (f), surface boundaries and/or an outer surface of the object are morphed to smooth the same.

6. The method of claim 1, wherein said filling step (e) comprises providing a transition segment between two adjacent work cells.

7. An additive manufacturing system for the rapid production of an object from a light-polymerizable resin, the additive manufacturing system comprising:
    an additive manufacturing apparatus;
    a processor; and
    a memory comprising instructions which, when executed by the processor, cause the processor to carry out, with said additive manufacturing apparatus, operations comprising:
    (a) inputting into the processor a boundary shape and a plurality of desired mechanical properties for said object;

(b) subdividing said boundary shape into a plurality of adjacent work cells in the processor;
(c) providing a plurality of lattices in a database, each lattice of the database including a geometry and a mechanical property;
(d) filling a first one of said work cells with a lattice from the database, the lattice selected based on the correspondence of the mechanical properties of said lattice to said desired mechanical properties of said object;
(e) filling the remaining ones of said work cells with lattices from said database to produce a filled boundary shape in the processor, each said lattice selected based on: (i) the correspondence of the mechanical properties of said lattice to the desired mechanical properties of the object, and (ii) the compatibility of adjacent lattices in adjacent work cells with one another; then
(f) producing said object by additive manufacturing from the light-polymerizable resin and the filled boundary shape,
wherein said database includes a manufacturability score for said additive manufacturing step for each said lattice, and said filling steps (d)-(e) are carried out with preference for lattices having a higher manufacturability score.

8. A computer program product for the rapid production of an object from a light-polymerizable resin, the computer program product comprising a non-transitory computer readable storage medium having computer readable software code sections embodied in the medium, which software code sections are configured to carry out operations comprising:

(a) inputting into a processor a boundary shape and a plurality of desired mechanical properties for said object;
(b) subdividing said boundary shape into a plurality of adjacent work cells in the processor;
(c) providing a plurality of lattices in a database, each lattice of the database including a geometry and a mechanical property;
(d) filling a first one of said work cells with a lattice from the database, the lattice selected based on the correspondence of the mechanical properties of said lattice to said desired mechanical properties of said object;
(e) filling the remaining ones of said work cells with lattices from said database to produce a filled boundary shape in the processor, each said lattice selected based on: (i) the correspondence of the mechanical properties of said lattice to the desired mechanical properties of the object, and (ii) the compatibility of adjacent lattices in adjacent work cells with one another; then
(f) producing said object by additive manufacturing from the light-polymerizable resin and the filled boundary shape,
wherein said database includes a manufacturability score for said additive manufacturing step for each said lattice, and said filling steps (d)-(e) are carried out with preference for lattices having a higher manufacturability score.

9. The method of claim 2, further comprising, prior to said producing step (f), and after said confirming step, the step of:
performing a final manufacturing process simulation of said filled boundary shape as a check of manufacturability of said filled boundary shape.

* * * * *